(12) United States Patent
Peng

(10) Patent No.: US 10,874,010 B2
(45) Date of Patent: Dec. 22, 2020

(54) PIXEL-CONTROLLED LED LIGHT WITH BURNABLE SEQUENCE AND METHOD OF OPERATING THE SAME

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 16/543,971

(22) Filed: Aug. 19, 2019

(65) Prior Publication Data
US 2019/0373696 A1 Dec. 5, 2019

Related U.S. Application Data

(60) Continuation-in-part of application No. 16/237,045, filed on Dec. 31, 2018, now Pat. No. 10,462,866,
(Continued)

(51) Int. Cl.
*H05B 45/40* (2020.01)
*H05B 45/10* (2020.01)
(Continued)

(52) U.S. Cl.
CPC .............. *H05B 45/40* (2020.01); *H05B 45/10* (2020.01); *H05B 47/175* (2020.01); *H05B 47/19* (2020.01);
(Continued)

(58) Field of Classification Search
CPC ...... H05B 45/10; H05B 45/40; H05B 47/175; H05B 47/19; H04L 61/2038; H04L 61/2046
See application file for complete search history.

(56) References Cited

U.S. PATENT DOCUMENTS

| 6,119,255 A | 9/2000 | Akram |
|---|---|---|
| 7,015,825 B2 | 3/2006 | Callahan |
(Continued)

FOREIGN PATENT DOCUMENTS

| CN | 101603648 A | 12/2009 |
|---|---|---|
| CN | 101636023 A | 1/2010 |
(Continued)

OTHER PUBLICATIONS

Office Action issued in corresponding TW patent application No. 108126417 dated May 6, 2020.

*Primary Examiner* — Borna Alaeddini
(74) *Attorney, Agent, or Firm* — Muncy, Geissler, Olds & Lowe, PC

(57) ABSTRACT

A pixel-controlled LED light includes a plurality of LED modules and a controller. Each LED module includes at least one LED and a LED drive apparatus. The LED drive apparatus burns a counting ordinal number according to connection sequence thereof. The controller defines the counting ordinal number of the LED modules which need to be changed their light modes as a target value, and sequentially transmits light mode data whose number is greater than or equal to the target value to each of the LED modules. The LED drive apparatuses sequentially receive the light mode data for counting. If the sequence of the light mode data meets to the counting ordinal number of the LED drive apparatus, the LED drive apparatuses identify the light mode data that are met, and after identifying the light mode data, the LED drive apparatuses control the corresponding at least one LED.

18 Claims, 3 Drawing Sheets

Related U.S. Application Data which is a division of application No. 15/629,014, filed on Jun. 21, 2017, now Pat. No. 10,231,303, which is a continuation-in-part of application No. 14/521,118, filed on Oct. 22, 2014, now Pat. No. 9,930,734.

(51) Int. Cl.
  *H05B 47/19* (2020.01)
  *H05B 47/175* (2020.01)
  *H04L 29/12* (2006.01)

(52) U.S. Cl.
  CPC ...... *H04L 61/2038* (2013.01); *H04L 61/2046* (2013.01)

(56) References Cited

U.S. PATENT DOCUMENTS

| | | | |
|---|---|---|---|
| 9,173,259 | B1 | 10/2015 | Peng |
| 2002/0145394 | A1 | 10/2002 | Morgan et al. |
| 2003/0188202 | A1 | 10/2003 | D'Angelo et al. |
| 2007/0046590 | A1 | 3/2007 | Umezaki |
| 2007/0159422 | A1 | 7/2007 | Blandino |
| 2009/0244043 | A1 | 10/2009 | Kasai et al. |
| 2009/0289578 | A1* | 11/2009 | Peng ............... H05B 45/22 315/294 |
| 2011/0096099 | A1 | 4/2011 | Yamamoto et al. |
| 2011/0193484 | A1 | 8/2011 | Harbers et al. |
| 2011/0266976 | A1 | 11/2011 | Zhang |
| 2011/0285515 | A1* | 11/2011 | Fushimi ............... H05B 47/19 340/12.22 |
| 2013/0147370 | A1* | 6/2013 | Williams ............... H05B 45/20 315/185 R |
| 2013/0169178 | A1 | 7/2013 | Peng |
| 2014/0265880 | A1 | 9/2014 | Taipale et al. |
| 2014/0270797 | A1 | 9/2014 | Pederson |
| 2015/0245435 | A1 | 8/2015 | Peng |
| 2015/0282282 | A1 | 10/2015 | Breuer et al. |
| 2015/0289330 | A1 | 10/2015 | Peng |
| 2015/0341994 | A1* | 11/2015 | Wang ............... H05B 45/37 315/185 R |
| 2017/0004753 | A1 | 1/2017 | Kim et al. |
| 2018/0035501 | A1* | 2/2018 | Motomura ............ H05B 45/37 |

FOREIGN PATENT DOCUMENTS

| | | |
|---|---|---|
| CN | 201521844 U | 7/2010 |
| CN | 202496103 U | 10/2012 |
| CN | 203788523 U | 8/2014 |
| TW | I396411 B | 5/2013 |
| TW | I463329 B | 12/2014 |
| TW | I496507 B | 8/2015 |
| TW | I639359 B | 10/2018 |
| WO | WO 2008/048516 A2 | 4/2008 |

* cited by examiner

PIXEL-CONTROLLED LED LIGHT WITH BURNABLE SEQUENCE AND METHOD OF OPERATING THE SAME

CROSS REFERENCE TO RELATED APPLICATION

This application is a Continuation-in-Part of co-pending application Ser. No. 16/237,045, filed on Dec. 31, 2018, which is a divisional application of U.S. patent application Ser. No. 15/629,014, filed on Jun. 21, 2017, which is a continuation-in-part of U.S. patent application Ser. No. 14/521,118, filed on Oct. 22, 2014. The entire contents of which are hereby incorporated by reference.

BACKGROUND

Technical Field

The present disclosure relates to a LED light and a method of operating the same, and more particularly to a pixel-controlled LED light with burnable sequence and a method of operating the same.

Description of Related Art

The statements in this section merely provide background information related to the present disclosure and do not necessarily constitute prior art.

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

Take the festive light for example. Basically, a complete LED lamp includes an LED light string having a plurality of LEDs and a drive unit for driving the LEDs. The drive unit is electrically connected to the LED light string, and controls the LEDs by a pixel control manner or a synchronous manner by providing the required power and the control signal having light data to the LEDs, thereby implementing various lighting output effects and changes of the LED lamp.

In the current technology, in order to drive the LEDs of the LED string variously lighting, the LEDs have different address sequence data. The LEDs receive light signals involving light data and address data. If the address sequence data of the LEDs are the same as the address data of the light signals, the LEDs light according to the light data of the light signals. If the address sequence data of the LEDs are different from the address data of the light signals, the LEDs skip the light data of the light signals.

At present, the methods of sequencing the LEDs of the LED string are mostly complicated and difficult. For example, before the LEDs are assembled into the LED string, different address sequence data need to be burned for each of the LEDs. Thereafter, the LEDs are sequentially placed and assembled into the LED string according to the address sequence data. If the LEDs are not sequentially assembled in accordance with the address sequence data, the diverse illumination of the LEDs cannot be correctly achieved.

SUMMARY

An object of the present disclosure is to provide a pixel-controlled LED light with burnable sequence to solve the above-mentioned problems.

In order to achieve the above-mentioned object, the pixel-controlled LED light with burnable sequence includes a plurality of LED modules and a controller. The plurality of LED modules are electrically connected to each other. Each LED module includes at least one LED and a LED drive apparatus with burning function. The LED drive apparatus is coupled to the at least one LED and the LED drive apparatus burns a counting ordinal number according to connection sequence of the LED drive apparatus. The controller is electrically connected to the LED modules. The controller defines the counting ordinal number of the LED modules which need to be changed their light modes as a target value, and sequentially transmits light mode data whose number is greater than or equal to the target value to each of the LED modules. The LED drive apparatuses sequentially receive the light mode data for counting, if the sequence of the light mode data meets the counting ordinal number of the LED drive apparatus, the LED drive apparatuses identify the light mode data that are met, and after identifying the light mode data, the LED drive apparatuses control the corresponding at least one LED.

In one embodiment, the controller is configured to generate a working voltage and transmit the light mode data to each of the LED modules by changing magnitude of the working voltage.

In one embodiment, the controller is configured to control a voltage drop of the working voltage is less than a low-level voltage and transmit the light mode data to the LED modules.

In one embodiment, the number of the light mode data is equal to the number of the LED modules.

In one embodiment, the number of the light mode data is equal to the maximum counting ordinal number of the LED modules that need to be changed their light modes.

In one embodiment, the LED modules that need to be changed their light modes are configured to receive different light mode data.

In one embodiment, the LED modules that do not need to be changed their light modes are configured to receive the same light mode data.

In one embodiment, the LED modules that do not need to be changed their light modes are configured to receive the specific light mode data.

In one embodiment, the light mode data has an end code or has a start code and an end code.

In one embodiment, each of the LED drive apparatuses is burned by a contact burning or a non-contact burning.

Accordingly, the pixel-controlled LED light with burnable sequence is provided to realize the burning manner without address data only by counting the counting ordinal number to acquire the light mode data so that the LEDs of the LED modules can be also correctly controlled.

Another object of the present disclosure is to provide a method of operating a pixel-controlled LED light with burnable sequence to solve the above-mentioned problems.

In order to achieve the above-mentioned object, the method of operating the pixel-controlled LED light with burnable sequence is provided. The pixel-controlled LED light includes a plurality of LED modules and a controller. Each LED module includes at least one LED and a LED drive apparatus with burning function, and the LED drive apparatus burns a counting ordinal number according to connection sequence of the LED drive apparatus. The method includes the steps of: defining, by the controller, the counting ordinal number of the LED modules which need to be changed their light modes as a target value, and sequentially transmitting light mode data whose number is greater than or equal to the target value to each of the LED modules, sequentially receiving, by the LED drive apparatuses, the light mode data for counting, identifying, by the LED drive apparatuses, the light mode data that are met if the sequence of the light mode data meets the counting ordinal number of the LED drive apparatus, and controlling, by the LED drive apparatuses, the corresponding at least one LED.

In one embodiment, the controller is configured to generate a working voltage and transmit the light mode data to each of the LED modules by changing magnitude of the working voltage.

In one embodiment, the controller is configured to control a voltage drop of the working voltage is less than a low-level voltage and transmit the light mode data to the LED modules.

In one embodiment, the number of the light mode data is equal to the number of the LED modules.

In one embodiment, the number of the light mode data is equal to the maximum counting ordinal number of the LED modules that need to be changed their light modes.

In one embodiment, the LED modules that need to be changed their light modes are configured to receive different light mode data.

In one embodiment, the LED modules that do not need to be changed their light modes are configured to receive the same light mode data.

In one embodiment, the LED modules that do not need to be changed their light modes are configured to receive the specific light mode data.

In one embodiment, the light mode data has an end code or has a start code and an end code.

In one embodiment, each of the LED drive apparatuses is burned by a contact burning or a non-contact burning.

Accordingly, the method of controlling the pixel-controlled LED light with burnable sequence is provided to realize the burning manner without address data only by counting the counting ordinal number to acquire the light mode data so that the LEDs of the LED modules can be also correctly controlled.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
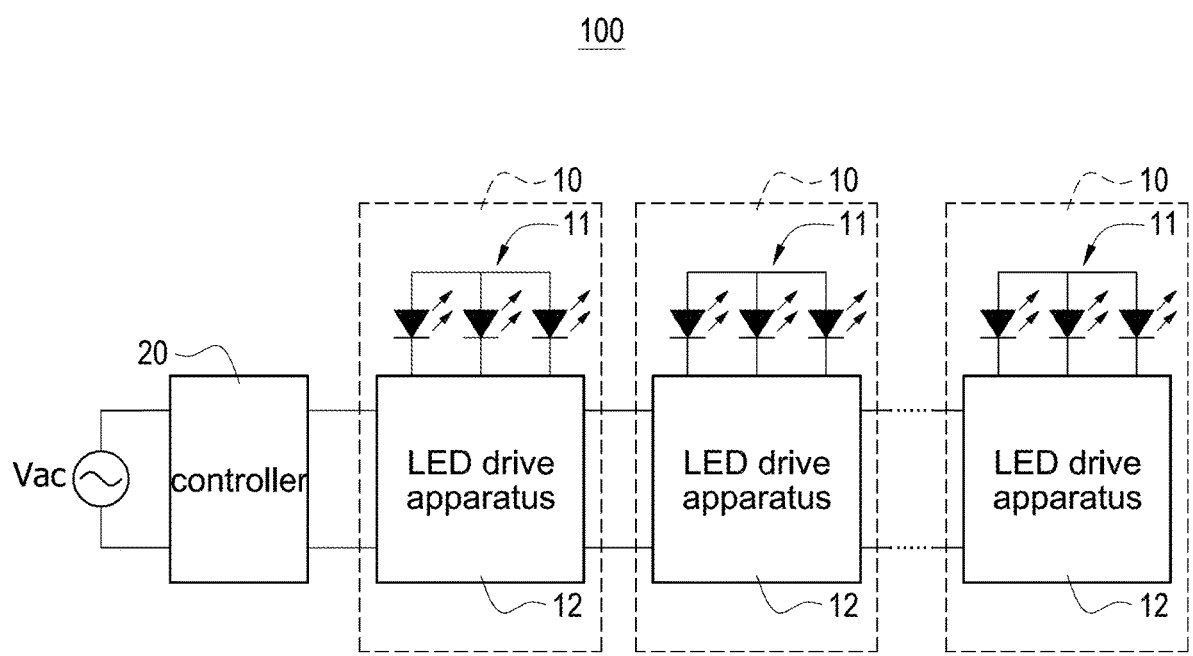
FIG. 1 is a schematic block diagram of a pixel-controlled LED light with burnable sequence according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a schematic block diagram of a pixel-controlled LED light with burnable sequence according to the present disclosure. The pixel-controlled LED light with burnable sequence 100 (hereinafter referred to as pixel-controlled LED light 100) is a two-wire structure, and the pixel-controlled LED light 100 includes a plurality of LED modules 10 and a controller 20. The LED modules 10 are electrically connected to each other. The controller 20 includes a power conversion circuit (not shown) and a control circuit (not shown), i.e., the power conversion circuit and the control circuit may be integrated into the controller 20. Specifically, the controller 20 may be implemented by a physical circuit control box including the power conversion circuit and the control circuit. The power conversion circuit receives an AC power source Vac and converts the AC power source Vac into a DC power source. The control circuit receives the DC power source to supply the required DC power for the control circuit and the pixel-controlled LED light 100.

Each of the LED modules 10 includes at least one LED 11 and a LED drive apparatus with burning function 12 (hereinafter referred to as LED drive apparatus 12). Each LED module 10 shown in FIG. 1 has three LEDs 11 involving three primary colors of red (R), green (G), and blue (B). The LED drive apparatus 12 is coupled to the at least one LED 11 and the LED drive apparatus 12 burns a counting ordinal number according to connection sequence thereof, and the detailed description will be made hereinafter. In one embodiment, each of the LED modules 10 is a LED module having data burning function, and therefore each of the LED modules 10 has own digital and analog circuits for burning light data and sequence (ordinal number) data.

The control circuit of the controller 20 can receive external light control data through a wired manner or a wireless manner as well as read internal light data stored inside the control circuit so that the control circuit can control each of the LED modules 10 of the pixel-controlled LED light 100 according to the content of the light control data. For example, the user may operate a computer through the wired manner to transmit the light control data to the control circuit so that the control circuit controls the LED modules 10 according to the light control data. Alternatively, the user may operate a mobile phone or a wearable device through the wireless manner to transmit the light control data to the control circuit so that the control circuit controls the LED modules 10 according to the light control data. However, the present disclosure is not limited by the above-mentioned manners of transmitting the light control data and the devices operated by the user.

The LED modules have physical electrical connections when the LED modules 10 are assembled, but the LED modules 10 have not been numbered. Therefore, the LED drive apparatuses with burning function 12 are used to burn the counting ordinal number to number the LED modules 10 so that the sequence of the LED modules 10 of the assembled pixel-controlled LED light 100 is clearly defined. For example, it is assumed that the number of the LED modules 10 is 50 and the 50 LED modules 10 are connected in series. Therefore, the counting ordinal number of the LED drive apparatus 12 of the 1st LED module 10 is 1, the counting ordinal number of the LED drive apparatus 12 of the 2nd LED module 10 is 2, and so on. Finally, the counting ordinal number of the LED drive apparatus 12 of the 50th LED module 10 is 50. Accordingly, each LED module 10 has its own unique identification ordinal number after the counting ordinal numbers of the LED modules 10 are defined. Specifically, each of the LED drive apparatuses 12 can be burned by a contact burning or a non-contact burning.

Afterward, the controller 20 defines the counting ordinal number of the LED modules 10 which need to be changed their light modes as a target value, and sequentially transmits light mode data whose number is greater than or equal to the target value to each of the LED modules 10. For convenience of explanation, the following description will be made by taking examples.

In the present disclosure, there are two specific embodiments, which are respectively described below.

The first embodiment: the controller 20 sequentially transmits the light mode data whose number is greater than the target value to each of the LED modules 10 such as that the controller 20 sequentially transmits the light mode data whose number is equal to the number of the LED modules 10. For example, it is assumed that the number of the LED modules 10 is 50, and the controller 20 sequentially transmits the light mode data whose number is 50. Moreover, it is assumed that the LEDs 11 in the 35th LED module 10 need to be changed their light modes from a light mode A (for example, it is continuously bright) to a light mode B (for example, it is flickering), and therefore the target value is 35. Therefore, the controller 20 transmits the light mode data whose number is 50 (that is greater than the target value=35) at once. As shown in table 1, the first row of the table 1 shows the counting ordinal number of the LED drive apparatus 12, i.e., the sequence of the LED modules 10 and the sequence of the light mode data. The second row of the table 1 shows the light mode data before change of the LEDs 11, in which "A" represents the light mode A, "B" represents the light mode B, and so on. The third row of the table 1 shows the light mode data after change of the LEDs 11.

The LED drive apparatuses 12 sequentially receive the light mode data for counting. If the sequence of the light mode data meets the counting ordinal number of the LED drive apparatus 12, the LED drive apparatuses 12 identify the light mode data that are met. After identifying the light mode data, the LED drive apparatuses 12 control the corresponding LEDs 11.

If the sequence of the light mode data is 1 and the corresponding light mode A is transmitted to the 1st LED module 10 (i.e., the counting ordinal number is 1), the 1st LED drive apparatus 12 identifies the light mode data that are met since the sequence of the light mode data meets (is equal to) the counting ordinal number (=1) of the 1st LED drive apparatus 12. At this condition, the light mode A is identified, and then the 1st LED drive apparatus 12 controls the LEDs 11 of the 1st LED module 10 to work according to the light mode A.

Afterward, the sequence of the light mode data is 1 and the corresponding light mode A is transmitted to the 2nd LED module 10, and the sequence of the light mode data is 2 and the corresponding light mode B is transmitted to the 1st LED module 10. For the 2nd LED module 10, the 2nd LED drive apparatus 12 does not identify the light mode data and does not control the LEDs 11 of the 2nd LED module 10 since the sequence (=1) of the light mode data does not meet (is not equal to) the counting ordinal number (=2) of the 2nd LED drive apparatus 12. Simultaneously, for the 1st LED module 10, the 1st LED drive apparatus 12 does not identify the light mode data and does not control the LEDs 11 of the 1st LED module 10 since the sequence (=2) of the light mode data does not meet (is not equal to) the counting ordinal number (=1) of the 1st LED drive apparatus 12.

Afterward, the sequence of the light mode data is 1 and the corresponding light mode A is transmitted to the 3rd LED module 10, the sequence of the light mode data is 2 and the corresponding light mode B is transmitted to the 2nd LED module 10, and the sequence of the light mode data is 3 and the corresponding light mode A is transmitted to the 1st LED module 10. For the 3rd LED module 10, the 3rd LED drive apparatus 12 does not identify the light mode data and does not control the LEDs 11 of the 3rd LED module 10 since the sequence (=1) of the light mode data does not meet (is not equal to) the counting ordinal number (=3) of the 3rd LED drive apparatus 12. Simultaneously, for the 2nd LED module 10, the 2nd LED drive apparatus 12 identifies the light mode data that are met since the sequence of the light mode data meets (is equal to) the counting ordinal number (=2) of the 2nd LED drive apparatus 12. At this condition, the light mode B is identified, and then the 2nd LED drive apparatus 12 controls the LEDs 11 of the 2nd LED module 10 to work according to the light mode B. Simultaneously, for the 1st LED module 10, the 1st LED drive apparatus 12 does not identify the light mode data and does not control the LEDs 11 of the 1st LED module 10 since the sequence (=3) of the light mode data does not meet (is not equal to) the counting ordinal number (=1) of the 1st LED drive apparatus 12.

As described above, only the first three LED modules 10 are described as examples for dynamic transmission of the light mode data, reception and recognition of each of the LED drive apparatuses 12, and control of the LEDs 11. The operation of the subsequent LED modules 10 is the same as that of the first three LED modules 10 and the detail description is omitted here for conciseness. Accordingly, the corresponding LEDs 11 are controlled to work according to the light mode data when the sequence of the light mode data meets the counting ordinal number of the LED drive apparatuses 12.

TABLE 1

| | sequence of the light mode data | | | | | | | | | |
|---|---|---|---|---|---|---|---|---|---|---|
| | 1 | 2 | 3 | 4 | ... | 35 | ... | 48 | 49 | 50 |
| the light mode data before change | A | B | A | C | ... | A | ... | B | A | C |
| the light mode data after change | A | B | A | C | ... | B | ... | B | A | C |

Moreover, it is assumed that the LEDs 11 in the 35th LED module 10 need to be changed their light modes, and therefore the LED drive apparatus 12 of the 35th LED module 10 receives different light mode data. For example, the LED drive apparatus 12 of the 35th LED module 10 having the counting ordinal number of 35 receives the light mode data after change that is B (the light mode data before change that is A). Also, the LEDs 11 in the LED modules 10 which do not need to be changed their light modes receive the same light mode data. For example, except the 35th LED module 10, other LED modules 10 receive the same light mode data as the light mode data before change. Accordingly, through the persistence of vision, the phenomenon seen by the human is that the light mode of the 1st to 34th LED modules 10 and the light mode of the 36th to 50th LED modules 10 have not changed, but the light mode of the 35th LED module 10 has changed (for example, from continuously bright to flickering). In particular, the light mode data received by the LED module 10 may be stored in a register or a memory thereof.

Accordingly, the burning manner without address data can be realized, and the LEDs 11 of the LED modules 10 can be also correctly controlled.

In addition, the light mode data has an end code or has a start code and an end code as a mark for determining the end or start of the light mode data. As shown in table 2 and table 3, they are examples of adding the end code and adding the start code and the end code respectively to table 1.

TABLE 2

| | sequence of the light mode data | | | | | | | | | |
|---|---|---|---|---|---|---|---|---|---|---|
| | 1 | 2 | 3 | 4 | ... | 35 | ... | 48 | 49 | 50 |
| the light mode data before change | A | B | A | C | ... | A | ... | B | A | C | Z |
| the light mode data after change | A | B | A | C | ... | B | ... | B | A | C | Z |

As shown in table 2, the end code is, for example but not limited to, represented by "Z", and it can also be represented by other symbols or numbers that are sufficiently separated. When the "Z" of the light mode data is transmitted from the controller 20, it indicates that all the number of the light mode data have been completely transmitted. Until the next time that the LEDs 11 need to change their light modes, the controller 20 will transmit new light mode data again.

TABLE 3

| | sequence of the light mode data | | | | | | | | | |
|---|---|---|---|---|---|---|---|---|---|---|
| | 1 | 2 | 3 | 4 | ... | 35 | ... | 48 | 49 | 50 |
| the light mode data before change | X | A | B | A | C | ... | A | ... | B | A | C | Z |
| the light mode data after change | X | A | B | A | C | ... | B | ... | B | A | C | Z |

As shown in table 3, the start code is, for example but not limited to, represented by "X" and the end code is, for example but not limited to, represented by "Z", and they can also be represented by other symbols or numbers that are sufficiently separated. When the "X" of the light mode data is transmitted from the controller 20, it indicates that the 1st light mode data will be transmitted next the start code. When the "Z" of the light mode data is transmitted from the controller 20, it indicates that all the number of the light mode data have been completely transmitted. Until the next time that the LEDs 11 need to change their light modes, the controller 20 will transmit new light mode data again.

Moreover, if two or more LED modules 10 need to be simultaneously changed their light modes, for example the 4th, 35th, and 48th LED modules 10 need to be simultaneously changed their light modes, the controller 20 transmits the light mode data with different light modes to the 4th LED module 10 (for example from light mode C to light mode D), to the 35th LED module 10 (for example from light mode A to light mode B), and to the 48th LED module 10 (for example from light mode B to light mode C). Also, the controller 20 transmits the light mode data with the same light mode to other LED modules 10. Therefore, the effect of changing the light mode of the plurality of LED modules 10 can be realized, as shown in FIG. 4.

TABLE 4

| | sequence of the light mode data | | | | | | | | | |
|---|---|---|---|---|---|---|---|---|---|---|
| | 1 | 2 | 3 | 4 | ... | 35 | ... | 48 | 49 | 50 |
| the light mode data before change | X | A | B | A | C | ... | A | ... | B | A | C | Z |
| the light mode data after change | X | A | B | A | D | ... | B | ... | C | A | C | Z |

Moreover, if the LEDs 11 in the 35th LED module 10 need to be changed their light modes, and therefore the LED drive apparatus 12 of the 35th LED module 10 receives different light mode data. For example, the LED drive apparatus 12 of the 35th LED module 10 having the counting ordinal number of 35 receives the light mode data after change that is B (the light mode data before change that is A). Also, the LEDs 11 in the LED modules 10 which do not need to be changed their light modes receive the specific light mode data, for example but not limited to "R". Therefore, as long as the specific light mode data is recognized, it means that the LED modules 10 that receive the specific light mode data do not change their light modes, as shown in FIG. 5.

TABLE 5

| | sequence of the light mode data | | | | | | | | | |
|---|---|---|---|---|---|---|---|---|---|---|
| | 1 | 2 | 3 | 4 | ... | 35 | ... | 48 | 49 | 50 |
| the light mode data before change | A | B | A | C | ... | A | ... | B | A | C | Z |
| the light mode data after change | R | R | R | R | ... | B | ... | R | R | R | Z |

The second embodiment: the controller 20 sequentially transmits the light mode data whose number is equal to the target value to each of the LED modules 10 such as that the controller 20 sequentially transmits the light mode data whose number is the maximum counting ordinal number of the LED modules 10 that need to be changed their light modes. In this embodiment, the end code or the start code and the end code involved in the light data mode are similar to the first embodiment (as shown in table 2 and table 3), different light mode data received by the LED modules which need to change their light modes and the same light mode data received by the LED modules which do not need to change their light modes are similar to the first embodiment (as shown in table 1 to table 4), and different light mode data received by the LED modules which need to change their light modes and the specific light mode data received by the LED modules which do not need to change their light modes are similar to the first embodiment (as shown in FIG. 5). Therefore, the same technical features as the foregoing first embodiment will not be described herein.

If the LEDs 11 in the 4th LED module 10 need to be changed their light modes, the controller 20 transmits the light mode data whose number is 4 (that is equal to the target value=4, if the start code "X" and the end code "Z" are not involved) at once as shown in table 6. Since the maximum counting ordinal number of the LEDs 11 in the LED module 10 that need to be changed their light modes is 4, the controller 20 only transmits the light mode data whose number is 4 and further the end code "Z" as the mark for determining the end of the light mode data. In other words, it is not necessary to transmit the same or specific light mode data to the LED modules 10 which do not need to be changed their light modes after the 4th LED module 10 so that the data amount of the light mode data can be reduced.

TABLE 6

| | sequence of the light mode data | | | | | | | | | |
|---|---|---|---|---|---|---|---|---|---|---|
| | 1 | 2 | 3 | 4 | ... | 35 | ... | 48 | 49 | 50 |
| the light mode data before change | X | A | B | A | C | ... | A | ... | B | A | C | Z |
| the light mode data after change | X | A | B | A | D | Z | | | | | |

Moreover, if two or more LED modules 10 need to be simultaneously changed their light modes, for example the 4th and 35th LED modules 10 need to be simultaneously changed their light modes, the controller 20 transmits the light mode data whose number is 35 (that is equal to the target value=35, if the start code "X" and the end code "Z" are not involved) at once as shown in table 7. Since the maximum counting ordinal number of the LEDs 11 in the LED module 10 that need to be changed their light modes is 35, the controller 20 only transmits the light mode data whose number is 35 and further the end code "Z" as the mark for determining the end of the light mode data. In other words, it is not necessary to transmit the same or specific light mode data to the LED modules 10 which do not need to be changed their light modes after the 35th LED module 10 so that the data amount of the light mode data can be reduced. Accordingly, the burning manner without address data can be realized, and the LEDs 11 of the LED modules 10 can be also correctly controlled.

TABLE 7

| | sequence of the light mode data | | | | | | | | | |
|---|---|---|---|---|---|---|---|---|---|---|
| | 1 | 2 | 3 | 4 | ... | 35 | ... | 48 | 49 | 50 |
| the light mode data before change | X | A | B | A | C | ... | A | ... | B | A | C | Z |
| the light mode data after change | X | A | B | A | D | ... | B | Z | | | |

Figure 2A:
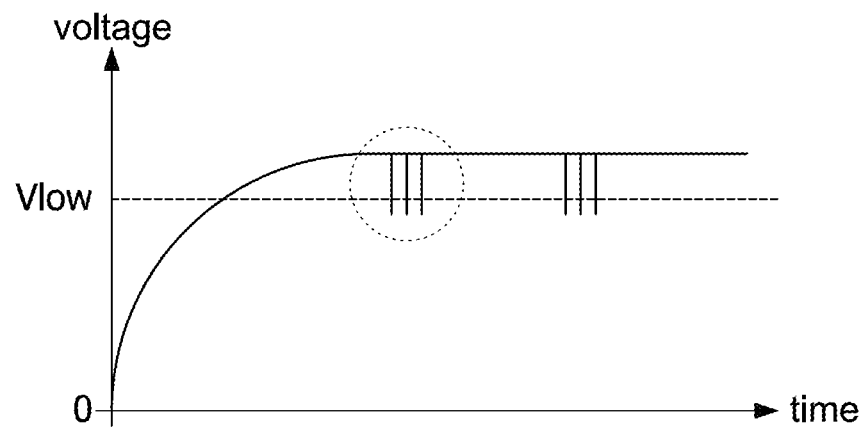
FIG. 2A is a schematic waveform of a working voltage for the pixel-controlled LED light with burnable sequence according to the present disclosure.
Figure 2B:
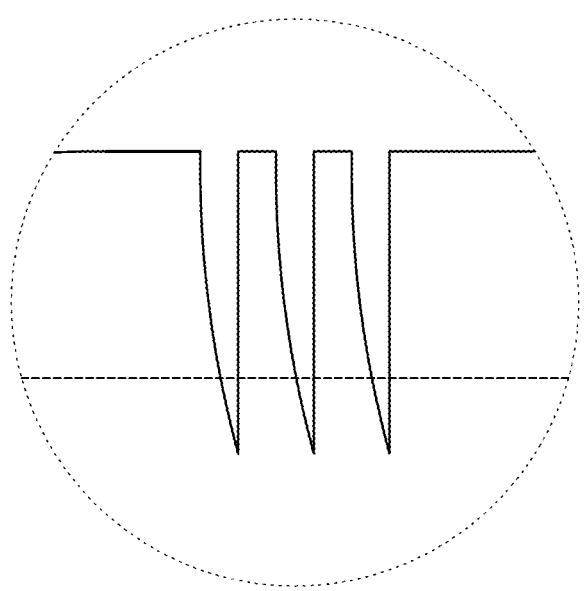
FIG. 2B is a partial enlarged view of FIG. 2A.

Please refer to FIG. 2, which shows a schematic waveform of a working voltage for the pixel-controlled LED light with burnable sequence according to the present disclosure. Also, FIG. 2B is a partial enlarged view of FIG. 2A. The two-wire pixel-controlled LED light 100 is controlled through a working voltage generated by controlling an output control switch (not shown) by a controller. As shown in FIG. 2A, when the working voltage is lower than an identifiable low-level voltage Vlow, the working voltage is as an effective voltage for controlling the LED modules 10. Further, a set of voltage with a plurality of effective control voltages are generated to control light mode data of the LED module 10. Therefore, multiple sets of voltages are transmitted by the controller 20 to control light mode data of the LED modules 10.

Figure 3:
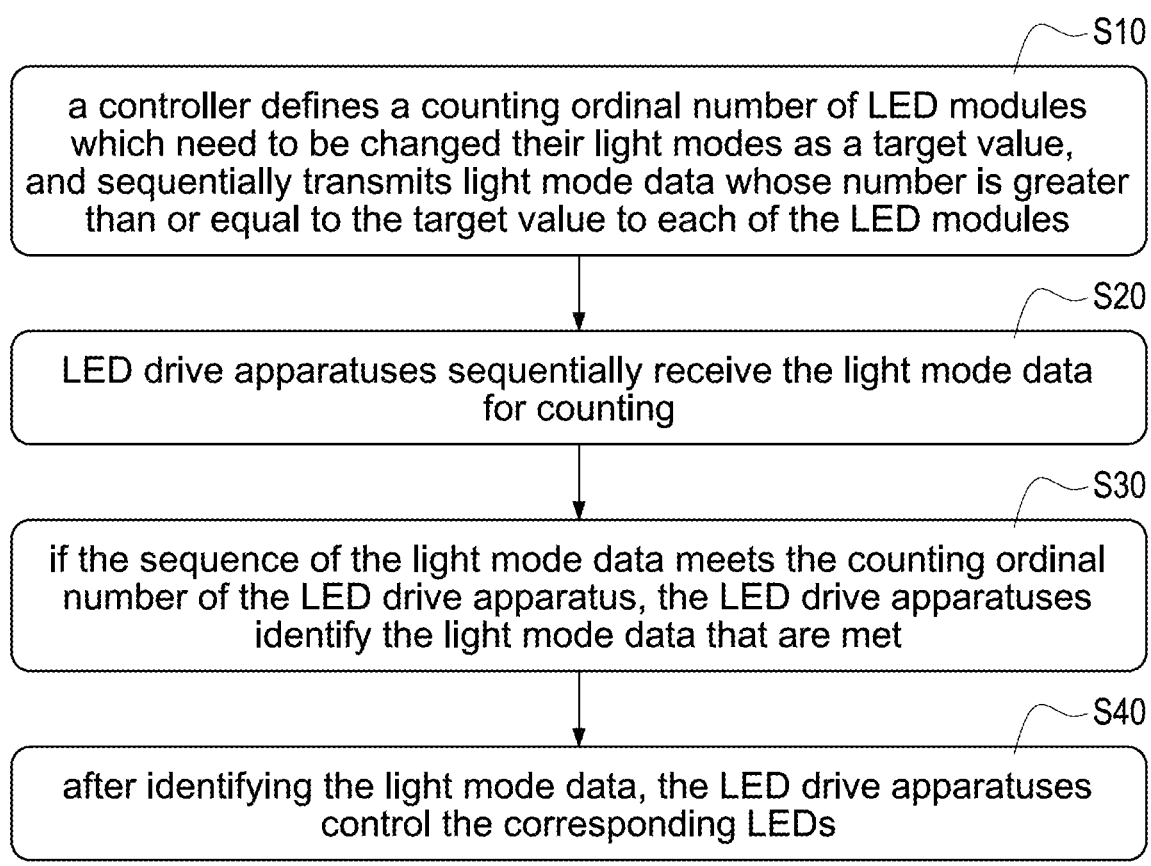
FIG. 3 is a flowchart of a method of operating the pixel-controlled LED light with burnable sequence according to the present disclosure.

Please refer to FIG. 3, which shows a flowchart of a method of operating the pixel-controlled LED light with burnable sequence according to the present disclosure. The pixel-controlled LED light includes a plurality of LED modules 10 and a controller 20. Each of the LED modules 10 includes at least one LED 11 and a LED drive apparatus with burning function 12. The LED drive apparatus 12 burns a counting ordinal number according to connection sequence thereof. The operating method includes steps as follows. First, the controller 20 defines the counting ordinal number of the LED modules 10 which need to be changed their light modes as a target value, and sequentially transmits light mode data whose number is greater than or equal to the target value to each of the LED modules 10 (S10). The LED modules have physical electrical connections when the LED modules 10 are assembled, but the LED modules 10 have not been numbered. Therefore, the LED drive apparatuses with burning function 12 are used to burn the counting ordinal number to number the LED modules 10 so that the sequence of the LED modules 10 of the assembled pixel-controlled LED light 100 is clearly defined. For example, it is assumed that the number of the LED modules 10 is 50 and the 50 LED modules 10 are connected in series. Therefore, the counting ordinal number of the LED drive apparatus 12 of the 1st LED module 10 is 1, the counting ordinal number of the LED drive apparatus 12 of the 2nd LED module 10 is 2, and so on. Finally, the counting ordinal number of the LED drive apparatus 12 of the 50th LED module 10 is 50. Accordingly, each LED module 10 has its own unique identification ordinal number after the counting ordinal numbers of the LED modules 10 are defined.

Afterward, the LED drive apparatuses 12 sequentially receive the light mode data for counting (S20). The controller 20 sequentially transmits the light mode data whose number is greater than the target value to each of the LED modules 10 such as that the controller 20 sequentially transmits the light mode data whose number is equal to the number of the LED modules 10. Alternatively, the controller 20 sequentially transmits the light mode data whose number is equal to the target value to each of the LED modules 10 such as that the controller 20 sequentially transmits the light mode data whose number is the maximum counting ordinal number of the LED modules 10 that need to be changed their light modes. The light mode data has an end code or has a start code and an end code as a mark for determining the end or start of the light mode data. Therefore, the controller 20 transmits the light mode data to control the LEDs 11 in one or more LED modules 10 to change their light modes.

Afterward, if the sequence of the light mode data meets the counting ordinal number of the LED drive apparatus 12, the LED drive apparatuses 12 identify the light mode data that are met (S30). Finally, after identifying the light mode data, the LED drive apparatuses 12 control the corresponding LEDs 11 (S40). The LED modules 10 perform light operations according to the received light mode data. Accordingly, the burning manner without address data can be realized, and the LEDs 11 of the LED modules 10 can be also correctly controlled.

In conclusion, the present disclosure has following features and advantages:

1. The LED modules have physical electrical connections when the LED modules 10 are assembled and the LED drive apparatuses with burning function 12 are used to burn the counting ordinal number to number the LED modules 10 so that the sequence of the LED modules 10 of the assembled pixel-controlled LED light 100 is clearly defined.

2. The burning manner without address data can be realized by counting the counting ordinal number to acquire the light mode data so that the LEDs 11 of the LED modules 10 can be also correctly controlled.

3. The number of the light mode data transmitted by the controller 20 is equal to the maximum counting ordinal number of the LEDs 11 in the LED module 10 that need to be changed their light modes, thereby reducing the data amount of the light mode data.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A pixel-controlled LED light with burnable sequence, comprising:
    a plurality of LED modules electrically connected to each other, each LED module comprising:
        at least one LED, and
        a LED drive apparatus with burning function coupled to the at least one LED and the LED drive apparatus configured to burn a counting ordinal number according to connection sequence of the LED drive apparatus, and
    a controller electrically connected to the LED modules, wherein the controller is configured to define the counting ordinal number of the LED modules as a target number for changing a light mode of each of the LED modules, and the controller sequentially transmits light mode data whose number is greater than or equal to the target value to each of the LED modules whose light mode need to be changed,
    wherein the LED drive apparatuses are configured to sequentially receive the light mode data for counting if the sequence of the light mode data is equal to the counting ordinal number of the LED drive apparatus, the LED drive apparatuses are configured to identify the light mode data for a corresponding at least one LED, and after identifying the light mode data, the LED drive apparatuses are configured to control the corresponding at least one LED,
    wherein the light mode data comprises a start code and an end code, wherein the start code determines the beginning of light mode data and the end code determines the end of the light mode data in order to reduce the amount of data transmitted by the light mode data.

2. The pixel-controlled LED light with burnable sequence in claim 1, wherein the controller is configured to generate a working voltage and transmit the light mode data to each of the LED modules by changing magnitude of the working voltage.

3. The pixel-controlled LED light with burnable sequence in claim 2, wherein the controller is configured to control a voltage drop of the working voltage, wherein the working voltage is less than a low-level voltage and transmit the light mode data to the LED modules.

4. The pixel-controlled LED light with burnable sequence in claim 1, wherein the light mode data is a data number that is equal to the number of the LED modules.

5. The pixel-controlled LED light with burnable sequence in claim 1, wherein the light mode data is a data number that is equal to the maximum counting ordinal number of the LED modules whose light modes need to be changed.

6. The pixel-controlled LED light with burnable sequence in claim 1, wherein the LED modules whose light modes need to be changed are configured to receive different light mode data.

7. The pixel-controlled LED light with burnable sequence in claim 1, wherein the LED modules whose light modes need not to be changed are configured to receive the same light mode data.

8. The pixel-controlled LED light with burnable sequence in claim 1, wherein the LED modules whose light modes need not to be changed are configured to receive a specific light mode data.

9. The pixel-controlled LED light with burnable sequence in claim 1, wherein each of the LED drive apparatuses is burned by a contact burning or anon-contact burning.

10. A method of operating a pixel-controlled LED light with burnable sequence, the pixel-controlled LED light comprising a plurality of LED modules and a controller, wherein each LED module comprises at least one LED and a LED drive apparatus with burning function, and the LED drive apparatus is configured to burn a counting ordinal number according to connection sequence of the LED drive apparatus, the method comprising the steps of:
    defining, by the controller, the counting ordinal number of the LED modules as a target number for changing a light mode of each of the LED modules, and sequentially transmitting, by the controller, light mode data whose number is greater than or equal to the target value to each of the LED modules whose light mode need to be changed,
    sequentially receiving, by the LED drive apparatuses, the light mode data for counting,
    identifying, by the LED drive apparatuses, the light mode data for a corresponding at least one LED if the sequence of the light mode data is equal to the counting ordinal number of the LED drive apparatus, and
    controlling, by the LED drive apparatuses, the corresponding at least one LED;
    wherein the light mode data comprises a start code and an end code, wherein the start code determines the beginning of light mode data and the end code determines the end of the light mode data in order to reduce the amount of data transmitted by the light mode data.

11. The method of operating the pixel-controlled LED light with burnable sequence in claim 10, wherein the controller is configured to generate a working voltage and transmit the light mode data to each of the LED modules by changing magnitude of the working voltage.

12. The method of operating the pixel-controlled LED light with burnable sequence in claim 10, wherein the controller is configured to control a voltage drop of the working voltage, wherein the working voltage is less than a low-level voltage and transmit the light mode data to the LED modules.

13. The method of operating the pixel-controlled LED light with burnable sequence in claim 10, wherein the light mode data is a data number that is equal to the number of the LED modules.

14. The method of operating the pixel-controlled LED light with burnable sequence in claim 10, wherein the light mode data is a data number that is equal to the maximum counting ordinal number of the LED modules whose light modes need to be changed.

15. The method of operating the pixel-controlled LED light with burnable sequence in claim 10, wherein the LED modules whose light modes need to be changed are configured to receive different light mode data.

16. The method of operating the pixel-controlled LED light with burnable sequence in claim 10, wherein the LED modules whose light modes need not to be changed are configured to receive the same light mode data.

17. The method of operating the pixel-controlled LED light with burnable sequence in claim 10, wherein the LED modules whose light modes need not to be changed are configured to receive a specific light mode data.

18. The method of operating the pixel-controlled LED light with burnable sequence in claim 10, wherein each of the LED drive apparatuses is burned by a contact burning or a non-contact burning.

* * * * *